US012802456B2

(12) United States Patent
Ohsugi

(10) Patent No.: US 12,802,456 B2
(45) Date of Patent: Nov. 17, 2026

(54) SURROUNDING SITUATION RECOGNITION DEVICE, SURROUNDING SITUATION RECOGNITION METHOD, AND NON-TRANSITORY RECORDING MEDIUM

(71) Applicant: TOYOTA JIDOSHA KABUSHIKI KAISHA, Toyota (JP)

(72) Inventor: Masamichi Ohsugi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/063,779

(22) Filed: Feb. 26, 2025

(65) Prior Publication Data

US 2025/0278940 A1 Sep. 4, 2025

(30) Foreign Application Priority Data

Mar. 4, 2024 (JP) ................................ 2024-031993

(51) Int. Cl.
*G06V 20/56* (2022.01)
*G06V 10/25* (2022.01)
*G06V 10/60* (2022.01)

(52) U.S. Cl.
CPC .............. *G06V 20/56* (2022.01); *G06V 10/25* (2022.01); *G06V 10/60* (2022.01); *G06V 2201/07* (2022.01)

(58) Field of Classification Search
CPC ........ G06V 20/56; G06V 10/25; G06V 10/60; G06V 2201/07; G06V 20/58; G06V 20/588
See application file for complete search history.

(56) References Cited

U.S. PATENT DOCUMENTS

| | | | | |
|---|---|---|---|---|
| 9,928,441 | B2 * | 3/2018 | Protter | G06T 7/507 |
| 10,990,834 | B2 * | 4/2021 | Hart | B60Q 1/0023 |
| 11,999,212 | B1 * | 6/2024 | Smith | G06V 20/58 |
| 2006/0111841 | A1 * | 5/2006 | Tseng | G06V 20/58 340/436 |

(Continued)

FOREIGN PATENT DOCUMENTS

| | | |
|---|---|---|
| JP | H07-009886 A | 1/1995 |
| JP | 2004-254044 A | 9/2004 |

(Continued)

OTHER PUBLICATIONS

Chen et al. "Vehicle Detection and Counting by Using Headlight Information in the Dark Environment", Nov. 26-28, 2007, IEEE (Year: 2007).*

*Primary Examiner* — Richard A Hansell, Jr.
(74) *Attorney, Agent, or Firm* — Dinsmore & Shohl LLP

(57) ABSTRACT

A surrounding situation recognition device acquires an image of the front of a vehicle shot by a camera located in a position out of a lower portion which is lower than a line segment connecting a headlight of the vehicle and a fallen object on a road surface in front of the vehicle, the line segment being included in a vertical plane and the lower portion being included in the vertical plane, and detects the fallen object included in the image by using the fact that a shadow created on the road surface by the fallen object blocking light emitted from the headlight is included in the image, the shadow being positioned on the opposite side of the headlight across the fallen object.

3 Claims, 5 Drawing Sheets

(56) References Cited

U.S. PATENT DOCUMENTS

| | | | | |
|---|---|---|---|---|
| 2010/0076621 | A1 | 3/2010 | Kubotani et al. | |
| 2010/0111362 | A1* | 5/2010 | Huang | G06V 10/50 382/164 |
| 2013/0147957 | A1* | 6/2013 | Stein | G01B 11/02 348/148 |
| 2015/0291097 | A1* | 10/2015 | O'Cualain | G06V 10/145 348/148 |
| 2020/0391751 | A1 | 12/2020 | Fujiyoshi et al. | |
| 2022/0319198 | A1* | 10/2022 | Yasui | B60W 40/06 |
| 2023/0298358 | A1* | 9/2023 | Levi | H04N 25/76 382/103 |

FOREIGN PATENT DOCUMENTS

| | | | | |
|---|---|---|---|---|
| JP | 2010-188970 | A | | 9/2010 |
| JP | 2011-086097 | A | | 4/2011 |
| KR | 20220055257 | A | * | 5/2022 |
| WO | 2008/126389 | A1 | | 10/2008 |
| WO | 2019/202628 | A1 | | 10/2019 |

* cited by examiner

SURROUNDING SITUATION RECOGNITION DEVICE, SURROUNDING SITUATION RECOGNITION METHOD, AND NON-TRANSITORY RECORDING MEDIUM

CROSS-REFERENCE TO RELATED APPLICATIONS

This application claims priority to Japanese Patent Application No. 2024-031993 filed Mar. 4, 2024, the entire contents of which are herein incorporated by reference.

FIELD

The present disclosure relates to surrounding situation recognition device, surrounding situation recognition method, and non-transitory recording medium.

BACKGROUND

PTL 1 (JP-A-2011-086097) discloses a technique in which an obstacle is detected based on an image shot by a camera mounted on a vehicle. In the technique described in PTL 1, the fact that a shadow created on a road surface by the obstacle blocking light emitted from a headlight is included in the image and the shadow is positioned on the opposite side of the headlight across the obstacle is not used in order to detect the obstacle. That is, in the technique described in PTL 1, the obstacle is not detected by using a portion included in the image corresponding to the shadow of the obstacle, but detected by using a portion included in the image corresponding to the obstacle.

For example, when the height of a fallen object (obstacle) on the road surface in front of the vehicle is low or the like, if only a portion corresponding to the fallen object (obstacle) included in the image shot by the camera mounted on the vehicle is used, there may be a case where it is difficult to detect the fallen object (obstacle). A technique capable of appropriately detecting the fallen object (obstacle) even when the height of the fallen object (obstacle) on the road surface in front of the vehicle is low or the like is desired.

SUMMARY

In view of the above-described points, it is an object of the present disclosure to provide surrounding situation recognition device, surrounding situation recognition method, and non-transitory recording medium that can appropriately detect a fallen object, such as a fallen object with a low height, which is difficult to detect by focusing only on the fallen object.

(1) One aspect of the present disclosure is a surrounding situation recognition device including a processor configured to: acquire an image of the front of a vehicle shot by a camera located in a position out of a lower portion which is lower than a line segment connecting a headlight of the vehicle and a fallen object on a road surface in front of the vehicle, the line segment being included in a vertical plane and the lower portion being included in the vertical plane; and detect the fallen object included in the image by using the fact that a shadow created on the road surface by the fallen object blocking light emitted from the headlight is included in the image, the shadow being positioned on the opposite side of the headlight across the fallen object.

(2) In the surrounding situation recognition device of the aspect (1), the processor may be configured to extract an area in which the fallen object affecting travel of the vehicle and the shadow of the fallen object may exist, the area being included in the image, and detect the fallen object based on the determination result of whether the shadow is included in the area.

(3) In the surrounding situation recognition device of the aspect (1) or (2), the processor may be configured to detect the fallen object included in the image based on the image by using a model obtained by performing learning using teacher data which is a data set of a learning image of the front of a learning vehicle shot by a camera of the learning vehicle and a label showing whether a shadow of a learning fallen object is included in the learning image, at least an area in which the learning fallen object affecting the travel of the learning vehicle and the shadow of the learning fallen object may exist may be cut out and used for the learning of the model, the area in which the learning fallen object and the shadow of the learning fallen object may exist being included in the learning image.

(4) Another aspect of the present disclosure is a surrounding situation recognition method including: acquiring an image of the front of a vehicle shot by a camera located in a position out of a lower portion which is lower than a line segment connecting a headlight of the vehicle and a fallen object on a road surface in front of the vehicle, the line segment being included in a vertical plane and the lower portion being included in the vertical plane; and detecting the fallen object included in the image by using the fact that a shadow created on the road surface by the fallen object blocking light emitted from the headlight is included in the image, the shadow being positioned on the opposite side of the headlight across the fallen object.

(5) Another aspect of the present disclosure is a non-transitory recording medium having recorded thereon a computer program for causing a processor to perform a process including: acquiring an image of the front of a vehicle shot by a camera located in a position out of a lower portion which is lower than a line segment connecting a headlight of the vehicle and a fallen object on a road surface in front of the vehicle, the line segment being included in a vertical plane and the lower portion being included in the vertical plane; and detecting the fallen object included in the image by using the fact that a shadow created on the road surface by the fallen object blocking light emitted from the headlight is included in the image, the shadow being positioned on the opposite side of the headlight across the fallen object.

According to the present disclosure, it is possible to appropriately detect a fallen object, such as a fallen object with a low height, which is difficult to detect by focusing only on the fallen object.

DESCRIPTION OF EMBODIMENTS

Figure 1:
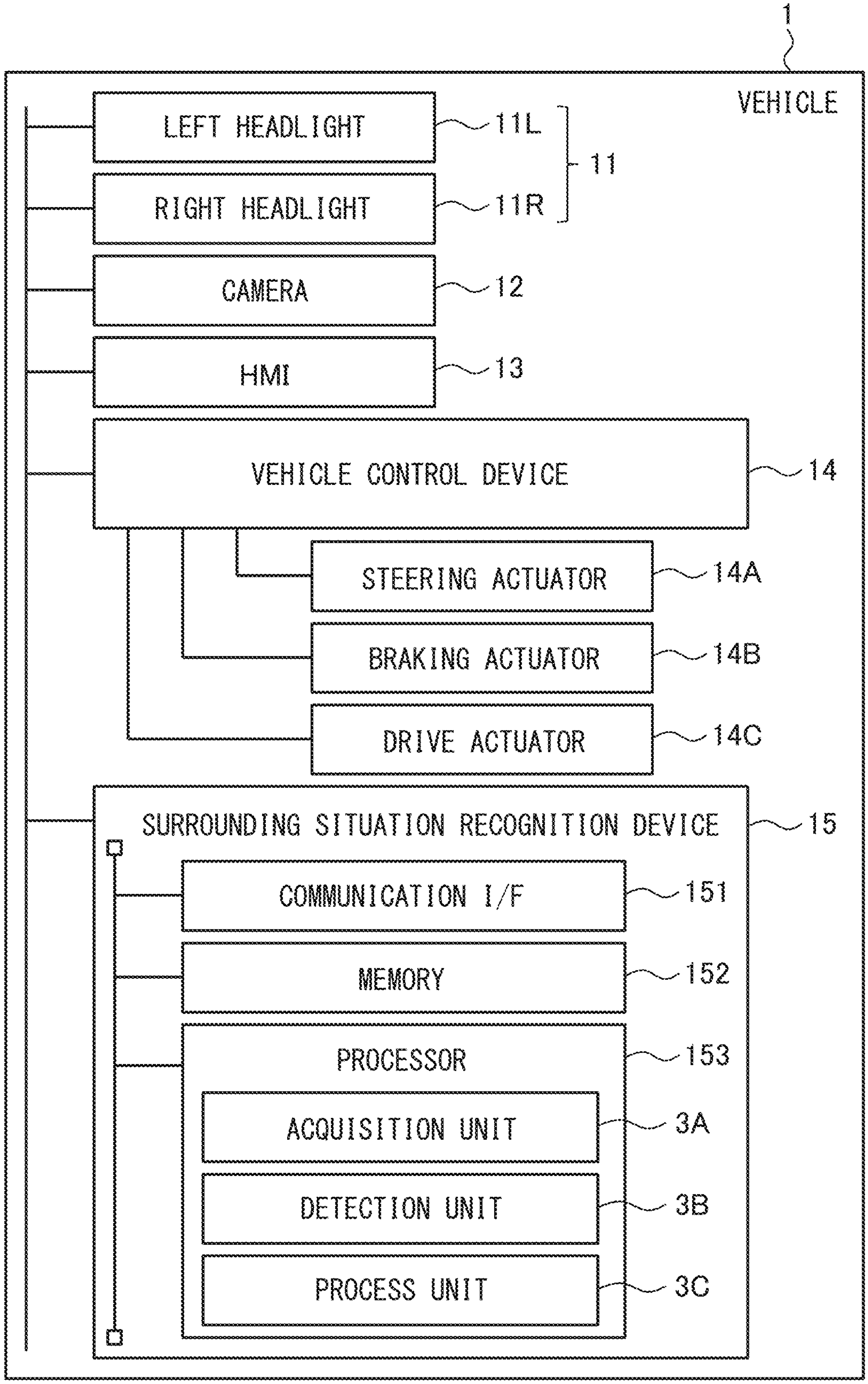
FIG. 1 is a view showing an example of a vehicle 1 to which a surrounding situation recognition device 15 of a first embodiment is applied.

Below, referring to the drawings, embodiments of surrounding situation recognition device, surrounding situation recognition method, and non-transitory recording medium of the present disclosure will be explained.

First Embodiment

Figure 2A:
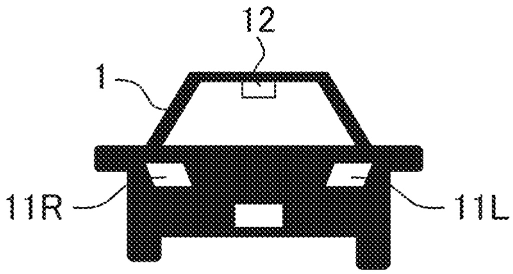
FIG. 2A is a view showing an example of a positional relationship between left headlight 11L and right headlight 11R and camera 11.
Figure 2B:
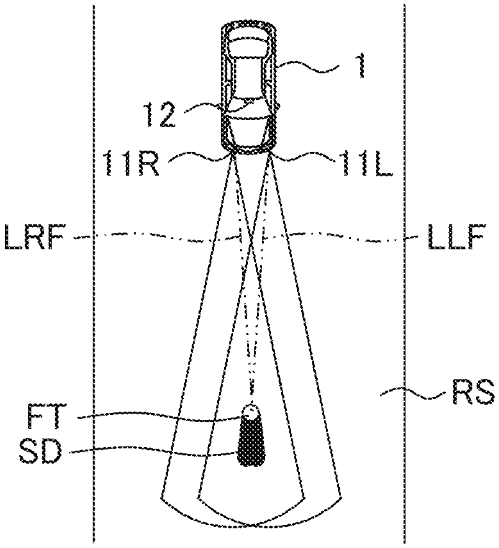
FIG. 2B is a view showing an example of a positional relationship between the vehicle 1, fallen object FT on a road surface RS in front of the vehicle 1, and shadow SD created on the road surface RS and positioned on the opposite side of a headlight 11 (left headlight 11L and right headlight 11R) across the fallen object FT.
Figure 2C:
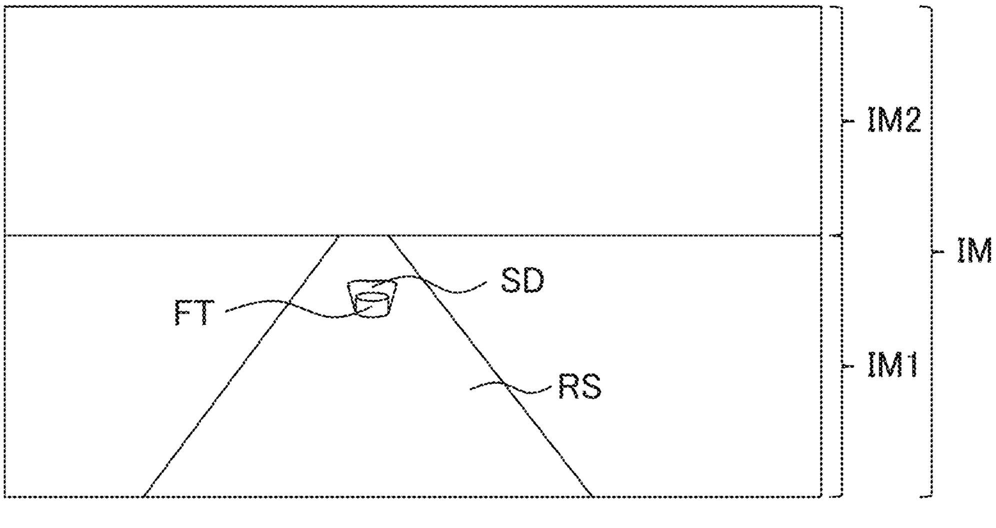
FIG. 2C is a view showing an example of an image IM of the front of the vehicle 1 shot by a camera 12.

FIG. 1 is a view showing an example of a vehicle 1 to which a surrounding situation recognition device 15 of a first embodiment is applied. FIG. 2A to FIG. 2C are views showing positional relationship between headlight 11 (left headlight 11L and right headlight 11R) and camera 11 provided with the vehicle 1 shown in FIG. 1 and the like. Specifically, FIG. 2A is a view showing an example of the positional relationship between the left headlight 11L and the right headlight 11R and the camera 11. Concretely, FIG. 2A is a front view of the vehicle 1. FIG. 2B is a view showing an example of a positional relationship between the vehicle 1, fallen object FT on a road surface RS in front of the vehicle 1, and shadow SD created on the road surface RS and positioned on the opposite side of the headlight 11 (left headlight 11L and right headlight 11R) across the fallen object FT. Particularly, FIG. 2B is a view of the vehicle 1, the fallen object FT, and the shadow SD from above. FIG. 2C is a view showing an example of an image IM of the front of the vehicle 1 shot by the camera 12.

In the example shown in FIG. 1 and FIG. 2A to FIG. 2C, the vehicle 1 includes the headlight 11, the camera 12, HMI (Human Machine Interface) 13, vehicle control device 14, steering actuator 14A, braking actuator 14B, drive actuator 14C, and the surrounding situation recognition device 15. The headlight 11 includes the left headlight 11L and the right headlight 11R.

In another example, lamps other than the left headlight 11L and the right headlight 11R, such as fog lamp and the like may be included in the headlight 11.

In the example shown in FIG. 1 and FIG. 2A to FIG. 2C, the camera 12 shoots an image IM (see FIG. 2C) of the front of the vehicle 1 and transmits data of the image IM to the vehicle control device 14 and the surrounding situation recognition device 15. The camera 12 is located above (upper side of FIG. 2A) the headlight 11 (left headlight 11L, right headlight 11R). Therefore, the image IM shot by the camera 12 includes the shadow SD (see FIG. 2B and FIG. 2C) created on the road surface RS by the fallen object FT (see FIG. 2B and FIG. 2C) on the road surface RS in front of the vehicle 1 blocking light emitted from the headlight 11 (left headlight 11L, right headlight 11R), the shadow SD is positioned on the opposite side (lower side of FIG. 2B, upper side of FIG. 2C) of the headlight 11 across the fallen object FT.

Specifically, in the example shown in FIG. 1 and FIG. 2A to FIG. 2C, as shown in FIG. 2B, the camera 12 is located in a position out of a lower portion which is lower than a line segment LLF connecting the left headlight 11L and the fallen object FT and is included in a vertical plane, and the line segment LLF is included in the vertical plane. Further, the camera 12 is located in the position out of a lower portion which is lower than a line segment LRF connecting the right headlight 11R and the fallen object FT and is included in a vertical plane, and the line segment LRF is included in the vertical plane.

The HMI 13 has the function of receiving various operations of a driver of the vehicle 1 and the like, and transmits signals indicating the operations of the driver of the vehicle 1 to the vehicle control device 14.

The vehicle control device 14 controls the headlight 11, the steering actuator 14A, the braking actuator 14B, and the drive actuator 14C based on information (data, signals) transmitted from the camera 12 and the HMI 13.

The surrounding situation recognition device 15 is configured by a microcomputer including communication interface (I/F) 151, memory 152, and processor 153.

The communication interface 151 includes an interface circuit for connecting the surrounding situation recognition device 15 to the camera 12, the HMI 13, the vehicle control device 14, and the like. The memory 152 stores a program used in a process performed by the processor 153 and various data. The processor 153 has the function as an acquisition unit 3A, the function as a detection unit 3B, and the function as a process unit 3C.

The acquisition unit 3A acquires the image IM of the front of the vehicle 1 shot by the camera 12.

The detection unit 3B detects the fallen object FT included in the image IM acquired by the acquisition unit 3A. For example, the detection unit 3B detects the fallen object FT included in the image IM based on the image IM acquired by the acquisition unit 3A by using a model obtained by performing learning using teacher data which is a data set of a learning image of the front of a learning vehicle shot by a camera of the learning vehicle and a label showing whether a shadow of a learning fallen object is included in the learning image.

That is, in the example shown in FIG. 1 and FIG. 2A to FIG. 2C, the detection unit 3B detects the falling object FT included in the image IM by using the fact that the shadow SD created on the road surface RS by the fallen object FT blocking the light emitted from the headlight 11 (left headlight 11L, right headlight 11R) as shown in FIG. 2B is included in the image IM as shown in FIG. 2C (that is, the fallen object FT is visible from the camera 12), and that the shadow SD is positioned on the opposite side (lower side of FIG. 2B) of the headlight 11 across the fallen object FT.

Therefore, in the example shown in FIG. 1 and FIG. 2A to FIG. 2C, even when the height of the fallen object FT is low, it is possible to detect the fallen object FT more appropriately than the technique described in PTL 1 which focuses only on the fallen object FT included in the image IM.

The process unit 3C performs a process for causing the HMI 13 to output a warning indicating that the fallen object FT exists on the road surface RS in front of the vehicle 1 when the fallen object FT on the road surface RS in front of the vehicle 1 is detected by the detection unit 3B.

Figure 3:
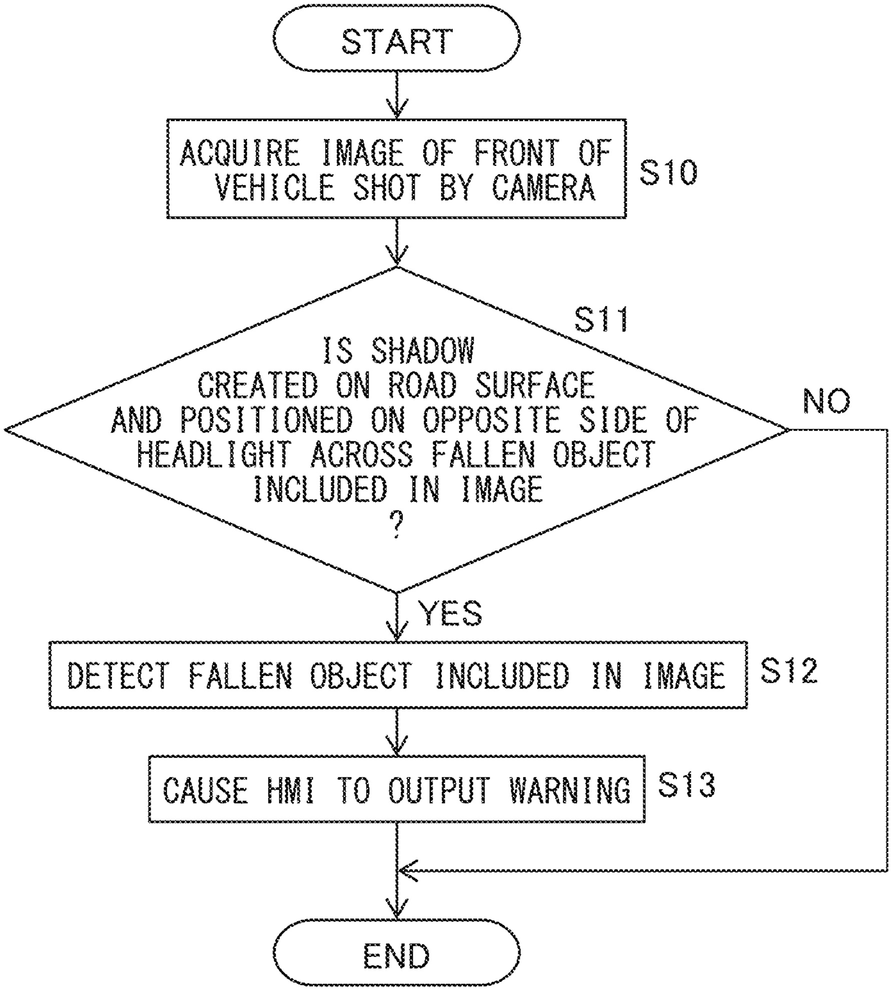
FIG. 3 is a flowchart for explaining an example of a process performed by a processor 153 of the surrounding situation recognition device 15 of the first embodiment.

FIG. 3 is a flowchart for explaining an example of the process performed by the processor 153 of the surrounding situation recognition device 15 of the first embodiment.

In the example shown in FIG. 3, at step S10, the acquisition unit 3A acquires the image IM of the front of the vehicle 1 shot by the camera 12.

At step S11, the detection unit 3B determines whether the shadow SD created on the road surface RS by the fallen object FT blocking the light emitted from the headlight 11 (left headlight 11L, right headlight 11R) is included in the image IM acquired at step S10 and the shadow SD is positioned on the opposite side of the headlight 11 across the fallen object FT. When YES, it proceeds to step S12; when NO, the process shown in FIG. 3 ends.

At step S12, the detection unit 3B detects the fallen object FT included in the image IM by using the fact that the shadow SD is included in the image IM.

At step S13, the process unit 3C performs the process of causing the HMI 13 to output the warning indicating that the fallen object FT exists on the road surface RS in front of the vehicle 1.

Second Embodiment

The vehicle 1 to which the surrounding situation recognition device 15 of a second embodiment is applied is configured similarly to the vehicle 1 to which the surrounding situation recognition device 15 of the first embodiment described above is applied, except that it will be described later.

Figure 4:
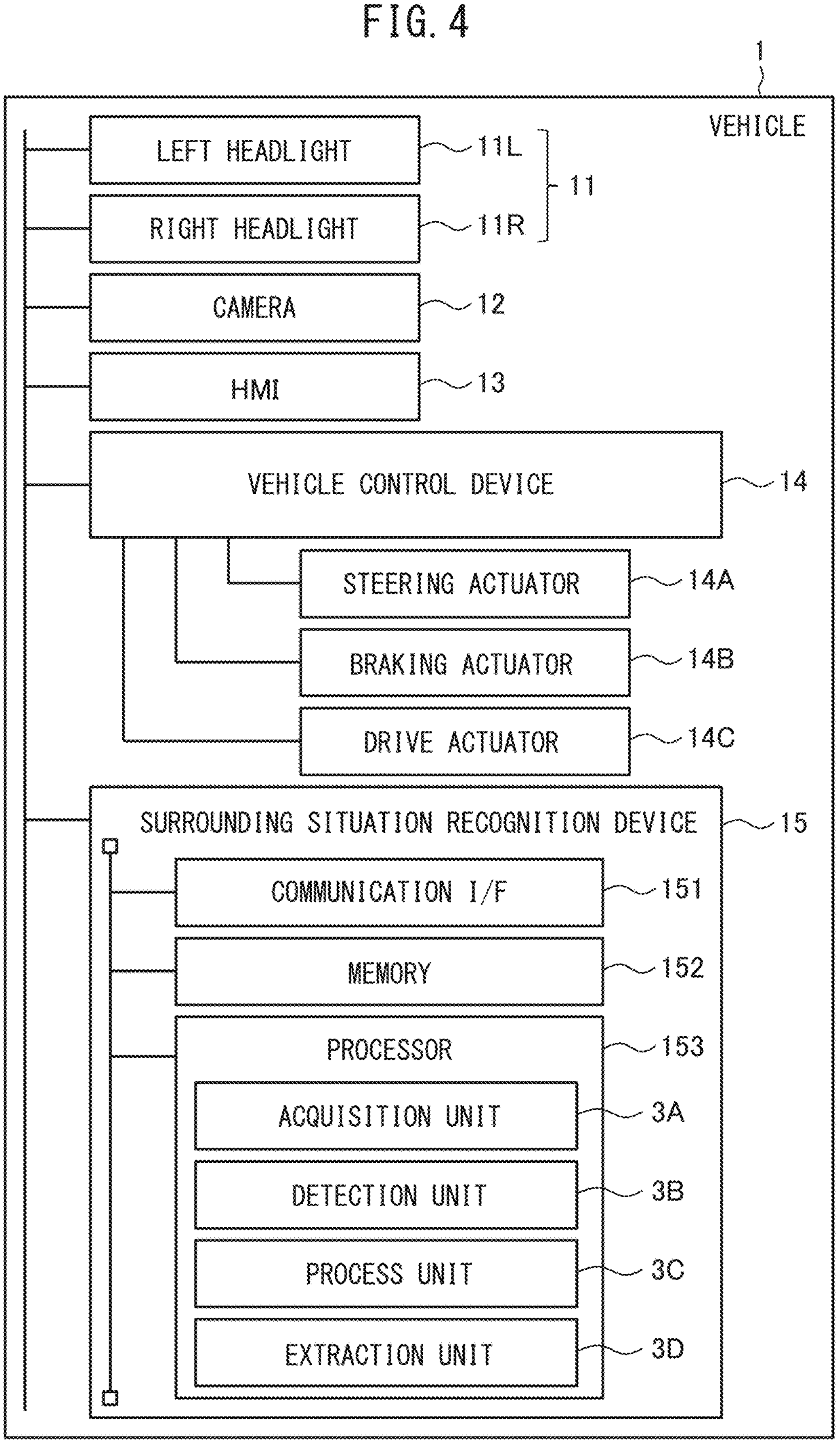
FIG. 4 is a view showing an example of the vehicle 1 to which the surrounding situation recognition device 15 of a second embodiment is applied.

FIG. 4 is a view showing an example of the vehicle 1 to which the surrounding situation recognition device 15 of the second embodiment is applied. In the example shown in FIG. 4, the processor 153 has the function as the acquisition unit 3A, the function as the detection unit 3B, the function as the process unit 3C, and the function as an extraction unit 3D.

The extraction unit 3D extracts an area IM1 (see FIG. 2C) in which the fallen object FT affecting travel of the vehicle 1 and the shadow SD of the fallen object FT may exist wherein the area IM1 is included in the image IM acquired by the acquisition unit 3A. That is, the extraction unit 3D does not extract an area IM2 (area above the horizon in the example shown in FIG. 2C) in which the fallen object FT and the shadow SD of the fallen object FT cannot exist wherein the area IM2 is included in the image IM acquired by the acquisition unit 3A.

Further, in the example shown in FIG. 4, the detection unit 3B detects the fallen object FT included in the area IM1 extracted by the extraction unit 3D from the image IM acquired by the acquisition unit 3A. For example, the detection unit 3B detects the fallen object FT included in the image IM (area IM1) based on the area IM1 extracted by the extraction unit 3D from the image IM acquired by the acquisition unit 3A by using the model obtained by performing the learning using the teacher data which is the data set of an area (area corresponding to the area IM1 shown in FIG. 2C) in which the learning fallen object and the shadow of the learning fallen object may exist wherein the area is included in the learning image of the front of the learning vehicle shot by the camera of the learning vehicle and the label showing whether the shadow of the learning fallen object is included in the area.

That is, the area (area corresponding to the area IM1 shown in FIG. 2C) in which the learning fallen object affecting the travel of the learning vehicle and the shadow of the learning fallen object may exist is cut out and used for the learning of the model wherein the area in which the learning fallen object and the shadow of the learning fallen object may exist is included in the learning image shot by the camera of the learning vehicle.

In the example shown in FIG. 4, since the area IM1 in which the fallen object FT is detected is smaller than the entire image IM, it is possible to decrease the computational burden of the processor 153 than the example shown in FIG. 1 and FIG. 2A to FIG. 2C in which the area in which the fallen object FT is detected is equal to the entire image IM.

In another example, a part of the area (area corresponding to the area IM1 shown in FIG. 2C) in which the learning fallen object affecting the travel of the learning vehicle and the shadow of the learning fallen object may exist and the area (area corresponding to the area IM2 shown in FIG. 2C) in which the learning fallen object affecting the travel of the learning vehicle and the shadow of the learning fallen object cannot exist may be cut out and used for the learning of the model wherein the area (area corresponding to the area IM1 shown in FIG. 2C) and the area (area corresponding to the area IM2 shown in FIG. 2C) are included in the learning image shot by the camera of the learning vehicle.

In the example shown in FIG. 4, the detection unit 3B detects the fallen object FT based on the determination result of whether the shadow SD of the fallen object FT is included in the area IM1 extracted by the extraction unit 3D.

That is, in the example shown in FIG. 4, the detection unit 3B detects the falling object FT included in the area IM1 of the image IM by using the fact that the shadow SD created on the road surface RS by the fallen object FT blocking the light emitted from the headlight 11 (left headlight 11L, right headlight 11R) as shown in FIG. 2B is included in the area IM1 of the image IM, and that the shadow SD is positioned on the opposite side (lower side of FIG. 2B) of the headlight 11 across the fallen object FT.

Figure 5:
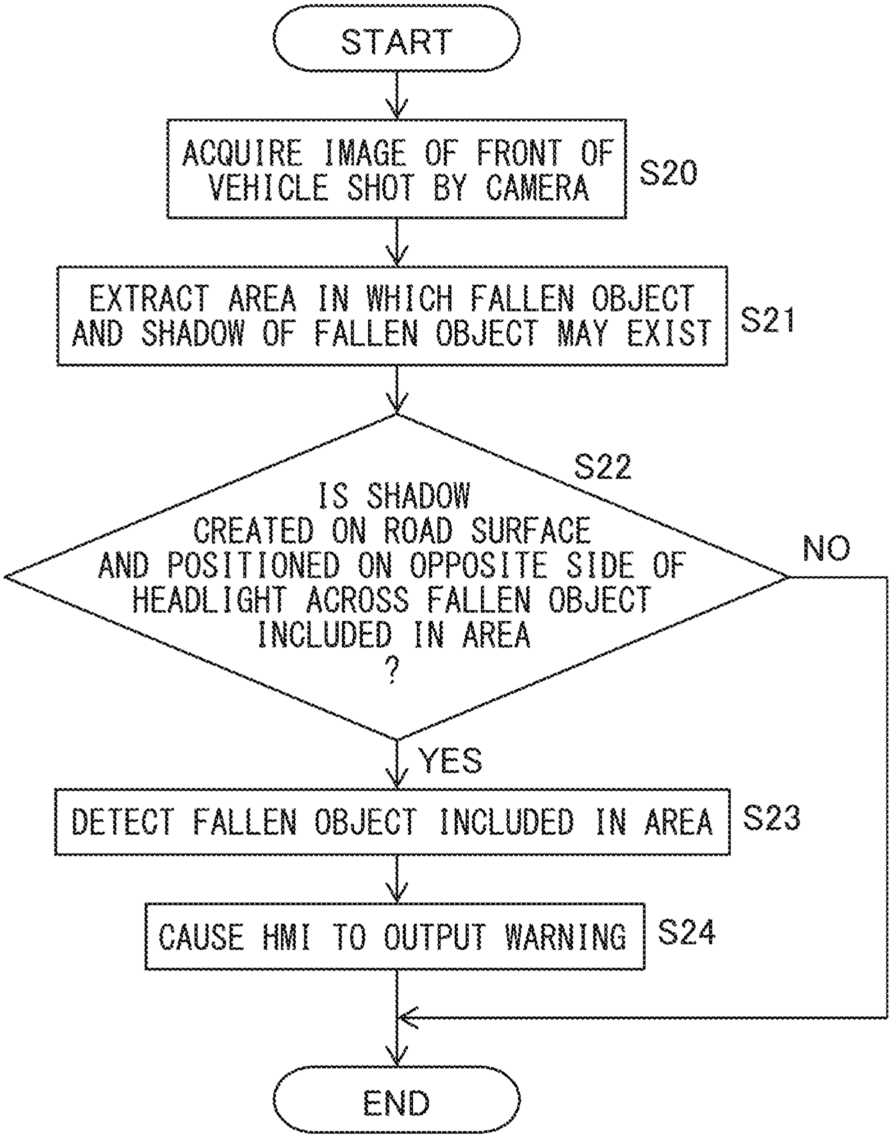
FIG. 5 is a flowchart for explaining an example of the process performed by the processor 153 of the surrounding situation recognition device 15 of the second embodiment.

FIG. 5 is a flowchart for explaining an example of the process performed by the processor 153 of the surrounding situation recognition device 15 of the second embodiment.

In the example shown in FIG. 5, at step S20, the acquisition unit 3A acquires the image IM of the front of the vehicle 1 shot by the camera 12.

At step S21, the extraction unit 3D extracts the area IM1 in which the fallen object FT affecting the travel of the vehicle 1 and the shadow SD of the fallen object FT may exist wherein the area IM1 is included in the image IM acquired at step S20.

At step S22, the detection unit 3B determines whether the shadow SD created on the road surface RS by the fallen object FT blocking the light emitted from the headlight 11 (left headlight 11L, right headlight 11R) is included in the area IM1 extracted at step S21 and the shadow SD is positioned on the opposite side of the headlight 11 across the fallen object FT. When YES, it proceeds to step S23; when NO, the process shown in FIG. 5 ends.

At step S23, the detection unit 3B detects the fallen object FT included in the area IM1 by using the fact that the shadow SD is included in the area IM1.

At step S24, the process unit 3C performs the process of causing the HMI 13 to output the warning indicating that the fallen object FT exists on the road surface RS in front of the vehicle 1.

Third Embodiment

The vehicle 1 to which the surrounding situation recognition device 15 of a third embodiment is applied is configured similarly to the vehicle 1 to which the surrounding situation recognition device 15 of the first embodiment described above is applied, except that it will be described later.

Figure 6:
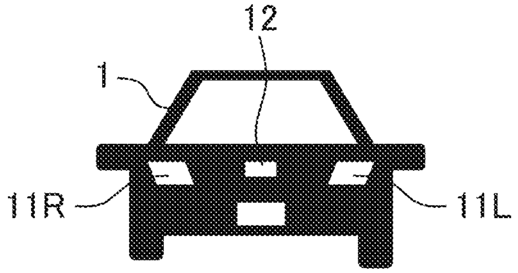
FIG. 6 is a view showing the positional relationship between the headlight 11 (left headlight 11L and right headlight 11R) and the camera 11 provided with the vehicle 1 to which the surrounding situation recognition device 15 of a third embodiment is applied.

FIG. 6 is a view showing the positional relationship between the headlight 11 (left headlight 11L and right headlight 11R) and the camera 11 provided with the vehicle 1 to which the surrounding situation recognition device 15 of the third embodiment is applied. Specifically, FIG. 6 is a view showing an example of the positional relationship between the left headlight 11L, the right headlight 11R, and the camera 12 of the vehicle 1 to which the surrounding situation recognition device 15 of the third embodiment is applied.

In the example shown in FIG. 6, the camera 12 is located on the side of the headlight 11 (right side (left side of FIG. 6) of the left headlight 11L and the left side (right side of FIG. 6) of the right headlight 11R). Specifically, in the example shown in FIG. 6, similarly to the example shown in FIG. 1 and FIG. 2A to FIG. 2C, the camera 12 is located in the position out of a lower portion which is lower than the line segment LLF connecting the left headlight 11L and the fallen object FT and is included in a vertical plane, and the line segment LLF is included in the vertical plane. Further, the camera 12 is located in the position out of a lower portion which is lower than the line segment LRF connecting the right headlight 11R and the fallen object FT and is included in a vertical plane, and the line segment LRF is included in the vertical plane.

Therefore, in the example shown in FIG. 6, similarly to the example shown in FIG. 1 and FIG. 2A to FIG. 2C, the image IM shot by the camera 12 includes the shadow SD created on the road surface RS by the fallen object FT (see FIG. 2B and FIG. 2C) on the road surface RS in front of the vehicle 1 blocking the light emitted from the headlight 11 (left headlight 11L, right headlight 11R), the shadow SD is positioned on the opposite side of the headlight 11 across the fallen object FT.

Fourth Embodiment

The vehicle 1 to which the surrounding situation recognition device 15 of a fourth embodiment is applied is configured in the same manner as the vehicle 1 to which the surrounding situation recognition device 15 of the first embodiment described above is applied, except that it will be described later.

In the example shown in FIG. 1 and FIG. 2A to FIG. 2C (example of the vehicle 1 to which the surrounding situation recognition device 15 of the first embodiment is applied), the vehicle control device 14 does not have an autonomous driving function in which the vehicle 1 is autonomously driven by controlling the steering actuator 14A, the braking actuator 14B, and the drive actuator 14C without the need for operation by the driver of the vehicle 1.

On the other hand, in an example of the vehicle 1 to which the surrounding situation recognition device 15 of the fourth embodiment is applied, the vehicle control device 14 has the autonomous driving function in which the vehicle 1 is autonomously driven by controlling the steering actuator 14A, the braking actuator 14B, and the drive actuator 14C without the need for operation by the driver of the vehicle 1. Specifically, the vehicle control device 14 generates a travel plan for the vehicle 1 to reach a destination based on, for example, map information, position information of the vehicle 1, information indicating the destination of the vehicle 1, and the like. Furthermore, the vehicle control device 14 causes the vehicle 1 to autonomously travel according to the travel plan. Specifically, the vehicle control device 14 causes the vehicle 1 to travel autonomously while correcting the travel plan so as to avoid a collision or the like between the vehicle 1 and surrounding vehicle or the like based on the image IM of the front of the vehicle 1 shot by the camera 12 and the like, and/or the measurement result or the like of the surrounding situation sensor 11.

In the example shown in FIG. 1 and FIG. 2A to FIG. 2C (example of the vehicle 1 to which the surrounding situation recognition device 15 of the first embodiment is applied), as described above, when the fallen object FT on the road surface RS in front of the vehicle 1 is detected by the detection unit 3B, the process unit 3C performs the process for causing the HMI 13 to output the warning indicating that the fallen object FT exists on the road surface RS in front of the vehicle 1.

On the other hand, in the example of the vehicle 1 to which the surrounding situation recognition device 15 of the fourth embodiment is applied, when the fallen object FT on the road surface RS in front of the vehicle 1 is detected by the detection unit 3B, the process unit 3C causes the vehicle control device 14 to perform correction of the travel plan for allowing the vehicle 1 to safely travel without the collision between the fallen object FT and the vehicle 1 or the like. The vehicle control device 14 performs correction of the travel plan in accordance with an instruction from the process unit 3C, and causes the vehicle 1 to travel autonomously according to the corrected travel plan.

As described above, although the embodiments of the surrounding situation recognition device, the surrounding situation recognition method, and the non-transitory recording medium of the present disclosure have been described with reference to the drawings, the surrounding situation recognition device, the surrounding situation recognition method, and the non-transitory recording medium of the present disclosure are not limited to the embodiments described above, and may be appropriately changed without departing from the scope of the present disclosure. The configuration of each example of the embodiment described above may be appropriately combined. In each example of the above-described embodiment, the process performed in the surrounding situation recognition device 15 has been described as software process performed by executing the program, but the process performed in the surrounding situation recognition device 15 may be process performed by hardware. Alternatively, the process performed by the surrounding situation recognition device 15 may be a combination of both software and hardware. Further, the program (program for realizing the function of the processor 153 of the surrounding situation recognition device 15) stored in the memory 152 of the surrounding situation recognition device 15 may be recorded in a computer-readable storage medium (non-transitory recording medium) such as, semiconductor memory, magnetic recording medium, optical recording medium, or the like for providing, distribution or the like.

The invention claimed is:

1. A surrounding situation recognition device comprising a processor configured to:

acquire an image of the front of a vehicle shot by a camera located in a position outside of a lower portion which is lower than a line segment connecting a headlight of the vehicle and a fallen object on a road surface in front of the vehicle, the line segment being included in a vertical plane and the lower portion being included in the vertical plane;

extract an area from the image in which a fallen object on a road surface in front of the vehicle and a shadow of the fallen object blocking the headlight may exist;

determine whether the shadow of the fallen object is included in the extracted area, and the shadow of the fallen object is positioned on an opposite side of a headlight of the vehicle across the fallen object;

upon determination that the shadow of the fallen object is included in the extracted area, and the shadow of the fallen object is positioned on the opposite side of the headlight of the vehicle across the fallen object, detect the fallen object; and detect the fallen object included in the image by using the fact that a shadow created on the road surface by the fallen object blocking light emitted from the headlight is included in the image, the shadow being positioned on the opposite side of the headlight across the fallen object, wherein the processor is configured to detect the fallen object included in the image based on the image by using a model obtained by performing learning using teacher data which is a data set of a learning image of the front of a learning vehicle shot by a camera of the learning vehicle and a label showing whether a shadow of a learning fallen object is included in the learning image, wherein at least an area in which the learning fallen object affecting the travel of the learning vehicle and the shadow of the learning fallen object may exist is cut out and used for the learning of the model, the area in which the learning fallen object and the shadow of the learning fallen object may exist being included in the learning image.

2. A surrounding situation recognition method comprising:

acquiring an image of the front of a vehicle shot by a camera located in a position outside of a lower portion which is lower than a line segment connecting a headlight of the vehicle and a fallen object on a road surface in front of the vehicle, the line segment being included in a vertical plane and the lower portion being included in the vertical plane;

extracting an area from the image in which a fallen object on a road surface in front of the vehicle and a shadow of the fallen object blocking the headlight may exist;

determining whether the shadow of the fallen object is included in the extracted area, and the shadow of the fallen object is positioned on an opposite side of a headlight of the vehicle across the fallen object;

upon determination that the shadow of the fallen object is included in the extracted area, and the shadow of the fallen object is positioned on the opposite side of the headlight of the vehicle across the fallen object, detecting the fallen object; and detecting the fallen object included in the image by using the fact that a shadow created on the road surface by the fallen object blocking light emitted from the headlight is included in the image, the shadow being positioned on the opposite side of the headlight across the fallen object, wherein the fallen object included in the image based on the image is detected by using a model obtained by performing learning using teacher data which is a data set of a learning image of the front of a learning vehicle shot by a camera of the learning vehicle and a label showing whether a shadow of a learning fallen object is included in the learning image, and wherein at least an area in which the learning fallen object affecting the travel of the learning vehicle and the shadow of the learning fallen object may exist is cut out and used for the learning of the model, the area in which the learning fallen object and the shadow of the learning fallen object may exist being included in the learning image.

3. A non-transitory computer-readable recording medium having recorded thereon a computer program for causing a processor to perform a process comprising:

acquiring an image of the front of a vehicle shot by a camera located in a position outside of a lower portion which is lower than a line segment connecting a headlight of the vehicle and a fallen object on a road surface in front of the vehicle, the line segment being included in a vertical plane and the lower portion being included in the vertical plane;

extracting an area from the image in which a fallen object on a road surface in front of the vehicle and a shadow of the fallen object blocking the headlight may exist;

determining whether the shadow of the fallen object is included in the extracted area, and the shadow of the fallen object is positioned on an opposite side of a headlight of the vehicle across the fallen object;

upon determination that the shadow of the fallen object is included in the extracted area, and the shadow of the fallen object is positioned on the opposite side of the headlight of the vehicle across the fallen object, detecting the fallen object; and detecting the fallen object included in the image by using the fact that a shadow created on the road surface by the fallen object blocking light emitted from the headlight is included in the image, the shadow being positioned on the opposite side of the headlight across the fallen object, wherein the fallen object included in the image based on the image is detected by using a model obtained by performing learning using teacher data which is a data set of a learning image of the front of a learning vehicle shot by a camera of the learning vehicle and a label showing whether a shadow of a learning fallen object is included in the learning image, and wherein at least an area in which the learning fallen object affecting the travel of the learning vehicle and the shadow of the learning fallen object may exist is cut out and used for the learning of the model, the area in which the learning fallen object and the shadow of the learning fallen object may exist being included in the learning image.

* * * * *